United States Patent
Yukimura

(10) Patent No.: US 10,501,601 B2
(45) Date of Patent: Dec. 10, 2019

(54) TIRE RUBBER COMPOSITION AND MANUFACTURING METHOD THEREFOR

(71) Applicant: BRIDGESTONE CORPORATION, Tokyo (JP)

(72) Inventor: Noriaki Yukimura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/893,307

(22) PCT Filed: May 28, 2014

(86) PCT No.: PCT/JP2014/064130
§ 371 (c)(1),
(2) Date: Nov. 23, 2015

(87) PCT Pub. No.: WO2014/192810
PCT Pub. Date: Dec. 4, 2014

(65) Prior Publication Data
US 2016/0115296 A1    Apr. 28, 2016

(30) Foreign Application Priority Data

May 31, 2013   (JP) ................................ 2013-115259

(51) Int. Cl.
| | | |
|---|---|---|
| C08K 5/405 | (2006.01) | |
| C08K 3/36 | (2006.01) | |
| C08K 3/04 | (2006.01) | |
| B60C 1/00 | (2006.01) | |
| C08K 5/548 | (2006.01) | |
| C08K 5/30 | (2006.01) | |
| C08L 9/06 | (2006.01) | |
| C08L 91/00 | (2006.01) | |

(52) U.S. Cl.
CPC ................ *C08K 5/405* (2013.01); *B60C 1/00* (2013.01); *B60C 1/0016* (2013.01); *C08K 3/04* (2013.01); *C08K 3/36* (2013.01); *C08K 5/30* (2013.01); *C08K 5/548* (2013.01); *C08L 9/06* (2013.01); *C08L 91/00* (2013.01)

(58) Field of Classification Search
CPC ............ C08K 3/04; C08K 5/405; C08K 3/36
USPC ....................................................... 524/191
See application file for complete search history.

(56) References Cited

U.S. PATENT DOCUMENTS

| | | | |
|---|---|---|---|
| 3,196,135 A | 7/1965 | Cottle | |
| 4,264,710 A * | 4/1981 | Kondoh | ............ G03F 7/027 |
| | | | 430/281.1 |
| 4,550,135 A * | 10/1985 | Iwama | ............ B60C 1/0016 |
| | | | 524/495 |
| 6,014,998 A | 1/2000 | Mowdood et al. | |
| 6,380,288 B1 | 4/2002 | Hojo et al. | |
| 2013/0267638 A1 | 10/2013 | Katou et al. | |
| 2013/0296463 A1 | 11/2013 | Katou et al. | |
| 2014/0329946 A1 | 11/2014 | Horie et al. | |

FOREIGN PATENT DOCUMENTS

| | | |
|---|---|---|
| JP | 48-12187 B1 | 4/1973 |
| JP | 11-130908 A | 5/1999 |
| JP | 2000-26661 A | 1/2000 |
| JP | 2002-521515 A | 7/2002 |
| JP | 2002-521516 A | 7/2002 |
| JP | 2003-514079 A | 4/2003 |
| JP | 2003-523472 A | 8/2003 |
| JP | 2003-530443 A | 10/2003 |
| WO | 98/44040 A1 | 10/1998 |
| WO | 2007/066689 A1 | 6/2007 |
| WO | 2008/123306 A1 | 10/2008 |
| WO | 2012/043854 A1 | 4/2012 |
| WO | WO2012043854 * | 4/2012 |

OTHER PUBLICATIONS

Communication dated Apr. 28, 2016, issued by the European Patent Office in corresponding European Application No. 14805002.4.
S.P. Thomas, et al., "Investigation on Synergic Activity of N-Benzylimine Aminothioformamide Binary Accelerator System in Sulfur Vulcanization of Natural Rubber", Journal of Applied Polymer Science, 2010, p. 2976-2981, vol. 116, No. 5.
International Search Report of PCT/JP2014/064130, dated Sep. 2, 2014. [PCT/ISA/210].

* cited by examiner

*Primary Examiner* — Deve V Hall
(74) *Attorney, Agent, or Firm* — Sughrue Mion, PLLC

(57) ABSTRACT

The present invention provides a tire rubber composition prepared by mixing at least one rubber component selected from natural rubbers and synthetic diene rubbers (A), a filler including an inorganic filler (B), a silane coupling agent (C) and a thiosemicarbazone derivative (D), and provides a production method for a tire rubber composition, wherein the tire rubber composition is kneaded in plural stages, and in the first stage of kneading, the rubber component (A), all or part of the inorganic filler (B), all or part of the silane coupling agent (C), and the thiosemicarbazone derivative (D) are kneaded, therefore providing a tire rubber composition having improved reactivity between the coupling agent and the rubber component and excellent in low-heat-generation property and a production method for the composition.

10 Claims, No Drawings

TIRE RUBBER COMPOSITION AND MANUFACTURING METHOD THEREFOR

CROSS REFERENCE TO RELATED APPLICATIONS

This application is a National Stage of International Application No. PCT/JP2014/064130 filed May 28, 2014, claiming priority based on Japanese Patent Application No. 2013-115259, filed May 31, 2013, the contents of all of which are incorporated herein by reference in their entirety.

TECHNICAL FIELD

The present invention relates to a tire rubber composition containing an inorganic filler and having an improved low-heat-generation property, and to a method for producing the composition.

BACKGROUND ART

As a technique for satisfying both low rolling resistance and high braking performance on wet road surfaces, it is effective to use silica as a filler. Here, it is indispensable to use a silane coupling agent together with silica for securing further loss reduction and abrasion resistance. In addition, a silane coupling agent plays a role to prevent a vulcanization accelerator from adsorbing to the surface of silica through interaction thereof with the surface of silica.

However, in the case where a silane coupling agent is used, an unreacted component may remain in rubber, thereby often causing rubber scorching during kneading. Consequently, it is known to use a small amount of a silane coupling agent in combination with a nonionic surfactant to give a rubber composition excellent in loss reduction, wet performance, abrasion resistance, workability and the like, without causing rubber scorching (see PTL 1).

However, in this case, since the nonionic surfactant adsorbs rapidly to the surface of silica, the reaction between the silane coupling agent and silica is inhibited. As a result, the capability of silica to reinforce the rubber component is lowered, and the abrasion resistance of the rubber component is thereby worsened.

PTL 2 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

PTL 3 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

PTL 4 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, PTL 5 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

As a case of increasing the activity of the coupling function of a silane coupling agent in consideration of kneading conditions, there is mentioned PTL 6.

In these inventions, however, the reaction between the silane coupling agent and the rubber component is not sufficient, and therefore there is still room for improving them in point of enhancing low-heat-generation property.

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. As a means for reducing the rolling resistance of tires, there is mentioned a method of applying a low-heat-generating rubber composition to tires.

As a means for obtaining a low-heat-generating rubber composition, in the case of a synthetic diene rubber, there is mentioned a method of using, as the rubber composition, a polymer having an increased affinity to carbon black and silica (for example, see PTL 7). On the other hand, in the case of a natural rubber, there is mentioned a method of incorporating a highly-reactive carbon black into a modified natural rubber prepared by modifying a natural rubber (for example, see PTL 8).

According to PTLs 7 and 8, by increasing the affinity of the rubber component to the filler such as carbon black or the like, the heat-generation-property of the rubber composition can be lowered and accordingly there can be obtained tires having a low hysteresis loss.

However, with further advanced reduction in fuel consumption by automobiles, further improvement of low-heat-generating tires has become desired.

CITATION LIST

Patent Literature

PTL 1: JP-A 11-130908
PTL 2: JP-T 2002-521515
PTL 3: JP-T 2002-521516
PTL 4: JP-T 2003-530443
PTL 5: JP-T 2003-523472
PTL 6: WO2008/123306
PTL 7: JP-T 2003-514079
PTL 8: WO2007/066689

SUMMARY OF INVENTION

Technical Problem

The present invention has been made in that situation, and its object is to provide a tire rubber composition having an excellent low-heat-generation property in which the reactivity between the coupling agent and the rubber composition has been improved, and to provide a method for producing such a favorable tire rubber composition.

Solution to Problem

For solving the above-mentioned problems, the present inventor has found that, in a tire rubber composition comprising at least one rubber component selected from natural rubbers and synthetic diene rubbers (A), a filler including an inorganic filler (B), and a silane coupling agent (C), when a thiosemicarbazone derivative (D) is incorporated to enhance the activity of the coupling function and, further, as a production method for the tire rubber composition, when a specific kneading condition is employed, then the activity of the coupling function can be further enhanced, and have completed the present invention.

Specifically, the present invention provides:

[1] A tire rubber composition prepared by mixing at least one rubber component selected from natural rubbers and synthetic diene rubbers (A), a filler including an inorganic filler (B), a silane coupling agent (C) and a thiosemicarbazone derivative (D);

[2] A tire using the rubber composition described in the above [1];

[3] A method for producing a tire rubber composition to be prepared by mixing at least one rubber component selected from natural rubbers and synthetic diene rubbers (A), a filler including an inorganic filler (B), a silane coupling agent (C) and a thiosemicarbazone derivative (D), wherein the tire rubber composition is kneaded in plural stages, and in the first stage of kneading, the rubber component (A), all or part of the inorganic filler (B), all or part of the silane coupling agent (C), and the thiosemicarbazone derivative (D) are kneaded;

[4] A tire rubber composition obtained according to the production method for a tire rubber composition described in the above [3];

[5] A tire using the tire rubber composition described in the above [4].

Advantageous Effects of Invention

According to the present invention, the thiosemicarbazone derivative (D) is incorporated to increase the reactivity between the silane coupling agent and the rubber component. In particular, the thiosemicarbazone derivative (D) has better solubility in rubber as compared with conventional products, and accordingly the reaction between the silane coupling agent and the rubber component efficiently proceeds, therefore exhibiting the following effects.

(1) Reinforcement between silica and the rubber component is improved.

(2) The unreacted silane coupling agent decreases and rubber scorching can be prevented.

(3) The solubility of the thiosemicarbazone derivative (D) in rubber is better as compared with that of conventional products, and therefore the amount thereof to be added to the tire rubber composition can be reduced, and from this point, a tire rubber composition excellent in scorching resistance can be obtained.

(4) Dispersion of silica is efficiently improved, and therefore the low-heat-generation property of the tire rubber composition is favorably improved. In addition, the abrasion resistance is also improved.

(5) Further, since the thiosemicarbazone derivative (D) can directly react with the rubber component, a modified rubber is formed during kneading to thereby improve the dispersion of the filler, whereby further low-heat-generation property improvement can be attained.

(6) The thiosemicarbazone derivative (D) having reacted with the rubber component can interact with silica and carbon black, and therefore can exhibit the effect of improving the dispersion of not only silica but also carbon black.

(7) Further, by adding the thiosemicarbazone derivative (D) in the first stage of kneading, the above-mentioned effects (1) to (6) can be further enhanced.

As described above, according to the tire rubber composition and the production method for the tire rubber composition of the present invention, there can be provided a tire rubber composition excellent in low-heat-generation property and abrasion resistance.

DESCRIPTION OF EMBODIMENTS

The tire rubber composition of the present invention is described in detail hereinunder.

The tire rubber composition of the present invention is prepared by mixing at least one rubber component selected from natural rubbers and synthetic diene rubbers (A), a filler including an inorganic filler (B), a silane coupling agent (C) and a thiosemicarbazone derivative (D).

In the tire rubber composition of the present invention, preferably, the thiosemicarbazone derivative (D) is incorporated in an amount of from 0.05 to 15 parts by mass relative to 100 parts by mass of the rubber component (A), more preferably from 0.1 to 10 parts by mass, even more preferably from 0.2 to 10 parts by mass.

The ratio by mass of the thiosemicarbazone derivative (D) to the silane coupling agent (C) to be incorporated in the tire rubber composition {thiosemicarbazone derivative (D)/silane coupling agent (C)} is preferably from (2/100) to (100/100). When the ratio is (2/100) or more, the silane coupling agent (C) can be sufficiently activated, and when (100/100) or less, the components would not have any significant influence on the vulcanization rate. More preferably, the ratio by mass of the thiosemicarbazone derivative (D) to the silane coupling agent (C) to be incorporated in the tire rubber composition {thiosemicarbazone derivative (D)/silane coupling agent (C)} is from (4/100) to (80/100), even more preferably from (4/100) to (50/100).

The thiosemicarbazone derivative (D) in the present invention is not specifically limited, but is preferably a compound having a structure shown by the following formula (I).

(I)

The thiosemicarbazone derivative (D) in the present invention is more preferably a compound having a structure shown by the following formula (I-a). Various compounds are further preferably usable, as long as they contain the structure.

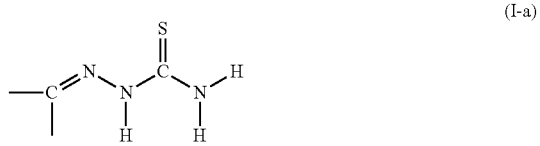

(I-a)

The compound having the structure shown by the above formula (I), especially the compound having the structure shown by the above formula (I-a) is preferably at least one compound selected from the group consisting of acetonethiosemicarbazone [alias: 1-(1-methylethylidene)thiosemicarbazide], 1-ethylidenethiosemicarbazide, 1-propylidenethiosemicarbazide, 1-(1-methylpropyhdene)thiosemicarbazide, 1-(1-ethylpropylidene)thiosemicarbazide, 1-(2-methylpropylidene)thiosemicarbazide, 1-(1,2-dimethylpropylidene)thiosemicarbazide, 1-(2,2-dimethylpropylidene)thiosemicarbazide, 1-(1,2,2-trimethylpropylidene)thiosemicarbazide, 1-butylidenethiosemicarbazide, 1-(1-methylbutylidene)thiosemicarbazide, 1-(1-ethylbutylidene)thiosemicarbazide, 1-(1-propylbuthylidene)thiosemicarbazide, 1-(2-methylbutylidene)thiosemicarbazide, 1-(2-ethylbutylidene)thiosemicarbazide, 1-(1-methyl-2-ethylbutylidene)thiosemicarbazide, 1-(1,2-dimethylbutylidene)thiosemicarbazide, 1-(1,3-dimethylbutylidene)thiosemicarbazide, 1-(1-methyl-2-ethylbutylidene)thiosemicarbazide, 1-(1-ethyl-2-methylbutylidene)thiosemicarbazide, 1-(2,2-dimethylbutylidene)thiosemicarbazide, 1-(1,2,2-trimethylbutylidene)thiosemicarbazide, 1-(1,2,3-trimethylbutylidene)thiosemicarbazide, 1-(2,3,3-trimethylbutylidene)thiosemicarbazide, 1-(2,3,3-trimethylbutylidene)thiosemicarbazide, 1-pentylidenethiosemicarbazide, 1-(1-methylpentylidene)thiosemicarbazide, 1-(1-ethylpentylidene)thiosemicarbazide, 1-(1-propylpentylidene)thiosemicarbazide, 1-(1-butylpentylidene)thiosemicarbazide, 1-(2-methylpentylidene)thiosemicarbazide, 1-(2-ethylpentylidene)thiosemicarbazide, 1-(2-propylpentylidene)thiosemicarbazide, 1-(1,2-dimethylpentylidene)thiosemicarbazide, 1-(1,2-diethylpentylidene)thiosemicarbazide, 1-(1-methyl-2-ethylpentylidene)thiosemicarbazide, 1-(1-methyl-2-propylpentylidene)thiosemicarbazide, 1-(1-ethyl-2-methylpentylidene)thiosemicarbazide, 1-(1-methyl-2-propylpentylidene)thiosemicarbazide, 1-(1-ethyl-2-propylpentylidene)thiosemicarbazide, 1-(1,3-dimethylpentylidene)thiosemicarbazide, 1-(1,3-diethylpentylidene)thiosemicarbazide, 1-(1,3-dipropylpentylidene)thiosemicarbazide, 1-(1,4-dimethylpentylidene)thiosemicarbazide, 1-(1,4-diethylpentylidene)thiosemicarbazide, 1-(1,4-dipropylpentylidene)thiosemicarbazide, 1-(2,2-dimethylpentylidene)thiosemicarbazide, 1-(2,2-diethylpentylidene)thiosemicarbazide, 1-(2,2-dipropylpentylidene)thiosemicarbazide, 1-(2,3-dimethylpentylidene)thiosemicarbazide, 1-(2,3-diethylpentylidene)thiosemicarbazide, 1-(2,3-dipropylpentylidene)thiosemicarbazide, 1-(2,4-dimethylpentylidene)thiosemicarbazide, 1-(2,4-diethylpentylidene)thiosemicarbazide, 1-(2,4-dipropylpentylidene)thiosemicarbazide, 1-(1,2,2-trimethylpentylidene)thiosemicarbazide, 1-(1,2,3-trimethylpentylidene)thiosemicarbazide, 1-(2,2,3-trimethylpentylidene)thiosemicarbazide, 1-(2,3,3-trimethylpentylidene)thiosemicarbazide, 1-(1,2,4-trimethylpentylidene)thiosemicarbazide, 1-(2,2,4-trimethylpentylidene)thiosemicarbazide, 1-(2,4,4-trimethylpentylidene)thiosemicarbazide, 1-(1,2,3-triethylpentylidene)thiosemicarbazide, 1-(1,2,3-triethylpentylidene)thiosemicarbazide, 1-(2,2,3-triethylpentylidene)thiosemicarbazide, 1-(2,3,3-triethylpentylidene)thiosemicarbazide, 1-benzylidenethiosemicarbazide, 1-(α-methylbenzylidene)thiosemicarbazide, 1-(2-methylbenzylidene)thiosemicarbazide, benzophenonethiosemicarbazone, 1-(2-phenylethylidene)thiosemicarbazide, cyclohexanecarboxyaldehydethiosemicarbazone, cyclohexanonethiosemicarbazone, and cylopentanonethiosemicarbazone; and among these, from the viewpoint of the effect, acetonethiosemicarbazone is especially preferred.

The silane coupling agent (C) for use in the tire rubber composition of the present invention is preferably at least one compound selected from the group consisting of compounds represented by the following general formulae (II) to (V).

Using the silane coupling agent (C) of the type, the tire rubber composition of the present invention is further excellent in workability in rubber processing, and can provide tires having better abrasion resistance The following general formulae (II) to (V) are described below in order.

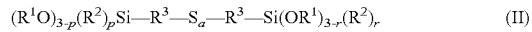

(II)

In the formula, plural $R^1$'s, if any, may be the same or different and each represent a substituent selected from a linear, cyclic or branched alkyl group having from 1 to 8 carbon atoms, a linear or branched alkoxylalkyl group having from 2 to 8 carbon atoms, and a hydrogen atom; plural $R^2$'s, if any, may be the same or different and each represent a linear, cyclic or branched alkyl group having from 1 to 8 carbon atoms; plural $R^3$'s, if any, may be the same or different and each represent a linear or branched alkylene group having from 1 to 8 carbon atoms; a indicates from 2 to 6 as a mean value; and p and r may be the same or different and each indicate from 0 to 3 as a mean value, provided that both p and r are not 3 at the same time.

Specific examples of the silane coupling agent (C) represented by the above-mentioned general formula (II) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide, etc.

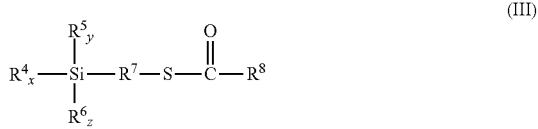

(III)

In the formula, $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$ each represent a hydrogen atom or a monovalent hydrocarbon group having from 1 to 18 carbon atoms; and h indicates from 1 to 4 as a mean value); $R^5$ represents $R^4$, a hydrogen atom, or a monovalent hydrocarbon group having from 1 to 18 carbon atoms; $R^6$ represents $R^4$, $R^5$, a hydrogen atom, or a group —$[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicate a number satisfying the relationship of x+y+2z=3, 0≤x≤3, 0≤y≤2, and 0≤z≤1.

In the general formula (III), $R^8$, $R^9$, $R^{10}$ and $R^{11}$, which may be the same or different, each preferably represent a group selected from the group consisting of a linear, cyclic or branched alkyl group, an alkenyl group, an aryl group and an aralkyl group, each having from 1 to 18 carbon atoms. In the case where $R^5$ is a monovalent hydrocarbon group having from 1 to 18 carbon atoms, preferred is a group selected from the group consisting of a linear, cyclic or branched alkyl group, an alkenyl group, an aryl and an aralkyl group. Preferably, $R^{12}$ is a linear, cyclic or branched alkylene group, and is more preferably a linear one. $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, more preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, $R^8$, $R^9$, $R^{10}$ and $R^{11}$ in the general formula (III) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (III) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent (C) represented by the general formula (III) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethxysilane, 2-decanoylthioethyltrimethoxysilane, 2-lauroylthioethyltrimethoxysilane, etc. Of those, especially preferred is 3-octanoylthiopropyltriethoxysilane (manufactured by Momentive Performance Materials Inc., trademark "NXT Silane").

$$(R^{13}O)_{3-s}(R^{14})_sSi-R^{15}-S_k-R^{16}-S_k-R^{15}-Si(OR^{13})_{3-t}(R^{14})_t \quad (IV)$$

In the formula, plural $R^{13}$'s, if any, may be the same or different and each represent a linear, cyclic or branched alkyl group having from 1 to 8 carbon atoms, a linear or branched alkoxylalkyl group having from 2 to 8 carbon atoms, or a hydrogen atom; plural $R^{14}$'s, if any, may be the same or different and each represent a linear, cyclic or branched alkyl group having from 1 to 8 carbon atoms; plural $R^{15}$'s, if any, may be the same or different and each represent a linear or branched alkylene group having from 1 to 8 carbon atoms; $R^{16}$ represents a divalent group selected from general formulae ($-S-R^{17}-S-$), ($-R^{18}-S_{m1}-R^{19}-$) and ($-R^{20}-S_{m2}-R^{21}-S_{m3}-R^{22}-$) (where $R^{17}$ to $R^{22}$ each represent a divalent substituent selected from a divalent hydrocarbon group, a divalent aromatic group and a divalent organic group containing a hetero element except sulfur and oxygen, each having from 1 to 20 carbon atoms; m1, m2 and m3 each indicate from 1 to less than 4 as a mean value); plural k's may be the same or different and each indicate from 1 to 6 as a mean value; and s and t each indicate from 0 to 3 as a mean value, provided that both s and t are not 3 at the same time.

Preferred examples of the silane coupling agent (C) represented by the above-mentioned general formula (IV) are compounds represented by an average compositional formula $(CH_3CH_2O)_3Si-(CH_2)_3-S_2-(CH_2)_6-S_2-(CH_2)_3-Si(OCH_2CH_3)$, an average compositional formula $(CH_3CH_2O)_3Si-(CH_2)_3-S_2-(CH_2)_{10}-S_2-(CH_2)_3-Si(OCH_2CH_3)_3$, an average compositional formula $(CH_3CH_2O)_3Si-(CH_2)_3-S_3-(CH_2)_6-S_3-(CH_2)_3-Si(OCH_2CH_3)_3$, an average compositional formula $(CH_3CH_2O)_3Si-(CH_2)_3-S_4-(CH_2)_6-S_4-(CH_2)_3-Si(OCH_2CH_3)_3$, an average compositional formula $(CH_3CH_2O)_3Si-(CH_2)_3-S-(CH_2)_6-S_2-(CH_2)_6-S-(CH_2)_3-Si(OCH_2CH_3)_3$, an average compositional formula $(CH_3CH_2O)_3Si-(CH_2)_3-S-(CH_2)_6-S_{2.5}-(CH_2)_6-S-(CH_2)_3-Si(OCH_2CH_3)_3$, an average compositional formula $(CH_3CH_2O)_3Si-(CH_2)_3-S-(CH_2)_6-S_3-(CH_2)_6-S-(CH_2)_3-Si(OCH_2CH_3)_3$, an average compositional formula $(CH_3CH_2O)_3Si-(CH_2)_3-S-(CH_2)_6-S_4-(CH_2)_6-S-(CH_2)_3-Si(OCH_2CH_3)_3$, an average compositional formula $(CH_3CH_2O)_3Si-(CH_2)_3-S-(CH_2)_{10}-S_2-(CH_2)_{10}-S-(CH_2)_3-Si(OCH_2CH_3)_3$, an average compositional formula $(CH_3CH_2O)_3Si-(CH_2)_3-S_4-(CH_2)_6-S_4-(CH_2)_6-S_4-(CH_2)_3-Si(OCH_2CH_3)_3$, an average compositional formula $(CH_3CH_2O)_3Si-(CH_2)_3-S_2-(CH_2)_6-S_2-(CH_2)_6-S_2-(CH_2)_3-Si(OCH_2CH_3)_3$, an average compositional formula $(CH_3CH_2O)_3Si-(CH_2)_3-S-(CH_2)_6-S_2-(CH_2)_6-S_2-(CH_2)_6-S-(CH_2)_3-Si(OCH_2CH_3)_3$, etc.

The silane coupling agent (C) represented by the general formula (IV) can be produced, for example, according to the method described in WO2004/000930 or JP-A 2006-167919.

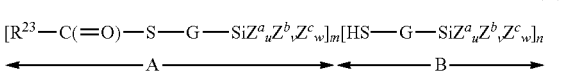

(V)

In the formula, $R^{23}$ represents a linear, branched or cyclic alkyl group having from 1 to 20 carbon atoms; plural G's, if any, may be the same or different and each represent an alkanediyl group or an alkenediyl group having from 1 to 9 carbon atoms; plural $Z^a$'s, if any, may be the same or different and each represent a functional group capable of bonding to the two silicon atoms and selected from [—O-]$_{0.5}$, [—O-G-]$_{0.5}$ and [—O-G-O-]$_{0.5}$; plural $Z^b$'s, if any, may be the same or different and each represent a functional group capable of bonding to the two silicon atoms and represented by [—O-G-O-]$_{0.5}$; plural $Z^c$'s, if any, may be the same or different and each represent a functional group selected from —Cl, —Br, —OR$^e$, R$^e$C(=O)O—, R$^e$R$^f$C=NO—, R$^e$R$^f$N—, R$^e$— and HO-G-O— (where G is the same as above); R$^e$ and R$^f$ each represent a linear, branched or cyclic alkyl group having from 1 to 20 carbon atoms; m, n, u, v and w each are 1≤m≤20, 0≤n≤20, 0≤u≤3, 0≤v≤2, 0≤w≤1, and (u/2)+v+2w is 2 or 3; in case where the formula has plural A's, $Z^a_u$, $Z^b_v$ and $Z^c_w$ may be the same or different in those plural A's; in case where the formula has plural B's, $Z^a_u$, $Z^b_v$ and $Z^c_w$ may be the same or different in those plural B's.

As the silane coupling agent represented by the chemical formula (V), a commercial product is available as "NXT Low-V Silane", a trade name by Momentive Performance Materials, Inc., and a commercial product is also available as "NXT Ultra Low-V Silane", a trade name by Momentive Performance Materials, Inc.

Among the silane coupling agent (C), those having a protected mercapto group can prevent occurrence of initial scorching during processing in the step before the vulcanization step, and can therefore provide good workability.

Further, the use of the silane coupling agent (C) where the carbon number of the alkoxysilane is large is favorable in point of working environment, since an amount of volatile compounds (VOC) (especially alcohol) generated is small.

Of the compounds represented by the general formulae (II) to (V), those represented by the above-mentioned general formula (II) are especially preferred for the silane coupling agent (C) in the present invention. This is because, in the thiosemicarbazone derivative (D), the polysulfide bond site to react with the rubber component (A) may be readily activated.

In the present invention, one alone or two or more different types of the silane coupling agents (C) may be used either singly or as combined.

The ratio by mass of the silane coupling agent (C) to the inorganic filler (B) in the tire rubber composition of the present invention {silane coupling agent (C)/inorganic filler (B)} is preferably from (1/100) to (60/100). When the ratio is (1/100) or more, the effect of improving the low-heat-generation property of the tire rubber composition can be exhibited, and when (60/100) or less, the cost of the tire rubber composition is not too high and therefore the economic efficiency can be improved. Further, the ratio by mass {silane coupling agent (C)/inorganic filler (B)} is more preferably from (3/100) to (50/100), even more preferably from (3/100) to (20/100).

As the synthetic diene rubber of the rubber component (A) for use in the tire rubber composition of the present invention, usable are styrene-butadiene copolymer rubber (SBR), polybutadiene rubber (BR), polyisoprene rubber (IR), acrylonitrile-butadiene copolymer rubber (NBR), butyl rubber (IIR), ethylene-propylene-diene tercopolymer rubber (EPDM), etc. One or more different types of natural rubbers and synthetic dienic rubbers may be used either singly or as mixed.

As the inorganic filler (B) for use in the tire rubber composition of the present invention, usable are silica and an inorganic compound represented by the following general formula (VI):

(VI)

In the general formula (VI), M$^1$ represents at least one selected from a metal selected from the group consisting of aluminium, magnesium, titanium, calcium and zirconium, oxides or hydroxides of these metals, their hydrates, and carbonates of these metals; d, x, y and z each indicate an integer of from 1 to 5, an integer of from 0 to 10, an integer of from 2 to 5, and an integer of from 0 to 10, respectively.

In the general formula (VI), when x and z are both 0, the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable; and above all, preferred is wet-method silica (precipitated silica), dry-method silica (fumed silica) or colloidal silica, and more preferred is wet-method silica (precipitated silica). Preferably, the BET specific surface area (as measured according to ISO 5794/1) of silica is from 40 to 350 m$^2$/g. Silica whose BET specific surface area falls within the range is advantageous in that it satisfies both rubber-reinforcing capability and dispersibility in rubber component. From this viewpoint, silica having a BET specific surface area falling within a range of from 80 to 350 m$^2$/g is more preferred; silica having a BET specific surface area falling within a range of from 120 m$^2$/g to 350 m$^2$/g is even more preferred. As silicas of those types, usable are commercial products of "Nipsil AQ" (BET specific surface area=205 m$^2$/g) and "Nipsil KQ", both trade names by Tosoh Silica Corporation, "Ultrasil VN3" (BET specific surface area=175 m$^2$/g), a trade name by Degussa, etc.

As the inorganic compound represented by the general formula (VI), usable are alumina (Al$_2$O$_3$) such as γ-alumina, α-alumina, etc.; alumina monohydrate (Al$_2$O$_3$.H$_2$O) such as boehmite, diaspore, etc.; aluminium hydroxide [Al(OH)$_3$] such as gypsite, bayerite, etc.; aluminium carbonate [Al$_2$(CO$_3$)$_3$], magnesium hydroxide [Mg(OH)$_2$], magnesium oxide (MgO), magnesium carbonate (MgCO$_3$), talc (3MgO.4SiO$_2$.H$_2$O), attapulgite (5MgO.8SiO$_2$.9H$_2$O), titanium white (TiO$_2$), titanium black (TiO$_{2n-1}$), calcium oxide (CaO), calcium hydroxide [Ca(OH)$_2$], aluminium magnesium oxide (MgO.Al$_2$O$_3$), clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), aluminium silicate (Al$_2$SiO$_5$, Al$_4$.3SiO$_4$.5H$_2$O, etc.), magnesium silicate (Mg$_2$SiO$_4$, MgSiO$_3$, etc.), calcium silicate (Ca$_2$.SiO$_4$, etc.), aluminium calcium silicate (Al$_2$O$_3$.CaO.2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$]; as well as crystalline aluminosilicate salts containing a charge-correcting hydrogen, alkali metal or alkaline earth metal such as various types of zeolite. Preferably, M$^1$ in the above-mentioned general formula (VI) is at least one selected from aluminium metal, aluminium oxide or hydroxide, and their hydrates, and aluminium carbonate.

One or more different types of the inorganic compounds of the general formula (VI) may be used either singly or as mixed. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica may be used in combination with one or more inorganic compounds of the general formula (VI).

If desired, the filler for use in the tire rubber composition of the present invention may contain carbon black in addition to the above-mentioned inorganic filler (B). Containing carbon black, the effect of lowering electric resistance to thereby prevent static electrification is exhibited. As for the carbon black, there is no particular limitation. For example, preferred is use of high, middle or low-structure SAF, ISAF, IISAF, N339, HAF, FEF, GPF, SRF-grade carbon black; and particularly preferred is use of SAF, ISAF, IISAF, N339, HAF or FEF-grade carbon black. Preferably, the nitrogen adsorption specific surface area ($N_2SA$, as measured according to JIS K 6217-2:2001) is from 30 to 250 $m^2/g$. One alone or two or more different types of such carbon black may be used either singly or as combined. In the present invention, the inorganic filler (B) does not include carbon black.

The inorganic filler (B) in the tire rubber composition of the present invention is used preferably in an amount of from 20 to 120 parts by mass relative to 100 parts by mass of the rubber component (A). When the amount is 20 parts by mass or more, it is favorable from the viewpoint of securing wet performance; and when 120 parts by mass or less, it is favorable from the viewpoint of reducing rolling resistance. Further, the amount is more preferably from 30 to 100 parts by mass.

Also preferably, the filler in the tire rubber composition of the present invention is incorporated in an amount of from 20 to 150 parts by mass relative to 100 parts by mass of the rubber component (A). When the amount is 20 parts by mass or more, it is favorable from the viewpoint of enhancing tire rubber composition reinforcing capability; and when 150 parts by mass or less, it is favorable from the viewpoint of reducing rolling resistance.

In the filler, preferably, the amount of the inorganic filler (B) is 30% by mass or more, more preferably 40% by mass or more, and even more preferably 70% by mass or more.

In the case where silica is incorporated as the inorganic filler (B), it is desirable that silica accounts for 30% by mass or more of the filler.

Next, a preferred production method for the tire rubber composition of the present invention is described in detail.

A preferred production method for the tire rubber composition of the present invention is a method for producing a tire rubber composition to be prepared by mixing at least one rubber component selected from natural rubbers and synthetic diene rubbers (A), a filler including an inorganic filler (B), a silane coupling agent (C) and a thiosemicarbazone derivative (D), wherein the tire rubber composition is kneaded in plural stages, and preferably in the first stage of kneading, the rubber component (A), all or part of the inorganic filler (B), all or part of the silane coupling agent (C), and the thiosemicarbazone derivative (D) are kneaded Here, the ratio by mass of the thiosemicarbazone derivative (D) relative to the silane coupling agent (C) in the tire rubber composition in the first stage of kneading {thiosemicarbazone derivative (D)/silane coupling agent (C)} is preferably from (2/100) to (100/100). When the ratio is (2/100) or more, the silane coupling agent (C) can be sufficiently activated, and when (100/100) or less, the components would not have any significant influence on the vulcanization rate. More preferably, the ratio by mass of the thiosemicarbazone derivative (D) to the silane coupling agent (C) in the tire rubber composition in the first stage of kneading {thiosemicarbazone derivative (D)/silane coupling agent (C)} is from (4/100) to (80/100), even more preferably from (4/100) to (50/100).

In the present invention, for bettering the dispersion of the inorganic filler such as silica or the like in the tire rubber composition, the highest temperature of the tire rubber composition in the first stage of kneading is preferably from 120 to 190° C., more preferably from 130 to 175° C., even more preferably from 140 to 170° C. The kneading time is preferably from 10 seconds to 20 minutes, more preferably from 10 seconds to 10 minutes, even more preferably from 30 seconds to 5 minutes.

In the preferred production method for the tire rubber composition of the present invention, in the first stage of kneading, the rubber component (A), all or part of the inorganic filler (B), all or part of the silane coupling agent (C) and the thiosemicarbazone derivative (D) may be added and kneaded all at a time, or in the first stage of kneading, the rubber component (A), all or part of the inorganic filler (B) and all or part of the silane coupling agent (C) are added and kneaded, and then on the way of the first stage, the thiosemicarbazone derivative (D) may be added and further kneaded. Preferably, in the first stage of kneading, the rubber component (A), all or part of the inorganic filler (B) and all or part of the silane coupling agent (C) are added, and then on the way of the first stage, the time to be taken before adding the thiosemicarbazone derivative (D) is from 0 to 180 seconds, more preferably from 10 to 180 seconds. The upper limit of the time is more preferably 150 seconds or less, even more preferably 120 seconds or less. When the time is 10 seconds or more, the reaction of (B) and (C) can sufficiently proceed. Even when the time is longer than 180 seconds, any further effect could hardly be exhibited since the reaction of (B) and (C) sufficiently proceeds, and the upper limit is preferably 180 seconds.

The kneading step for the tire rubber composition in the present invention preferably includes two stages of a first stage of kneading without a vulcanizing agent and a final stage of kneading with mixing a vulcanizing agent and others, and if desired, the step may include an intermediate stage of kneading without a vulcanizing agent and others. Here, the vulcanizing agent is a substance capable of network-like crosslinking the polymer chains of a plastic matter, conjugated diene rubber, and sulfur is a representative thereof. The vulcanizing agent is roughly grouped into an inorganic vulcanizing agent and an organic vulcanizing agent, and specific examples of the former include sulfur (powder sulfur, sublimed sulfur, deoxidized sulfur, precipitated sulfur, colloid sulfur, polymer sulfur, insoluble sulfur), and sulfur monochloride; and specific examples of the latter include those capable of releasing active sulfur through thermal dissociation, such as morpholine disulfide, alkylphenol disulfide, etc. Specific examples of other organic sulfur-containing vulcanizing agents are described in "Rubber Industry Handbook, 4th Edition" edited by Society of Rubber Industry, Japan (January 1994, issued by Society of Rubber Industry, Japan), III Compounding Chemicals, 1. Vulcanizing Agent.

The first stage of kneading in the present invention means the first stage of kneading the rubber component (A), the inorganic filler (B) and the silane coupling agent (C), and does not include a case of kneading the rubber (A) and a filler without adding the silane coupling agent (C) in the first stage, and a case of prekneading the rubber component (A) alone.

In the case where a master batch is difficult to prepare only in the first stage of kneading, or if desired, the first stage of kneading may be followed by an intermediate stage of kneading.

In the case where the step includes the intermediate stage after the first stage and before the final stage, the highest temperature of the tire rubber composition in the middle stage of kneading is preferably from 120 to 190° C., more preferably from 130 to 175° C., even more preferably from 140 to 170° C. The kneading time is preferably from 10 seconds to 20 minutes, more preferably from 10 seconds to 10 minutes, even more preferably from 30 seconds to 5 minutes. In the case where the step includes the intermediate stage, it is desirable that the temperature is lowered by 10° C. or more from the temperature after the end of kneading in the previous stage, preferably lowered to room temperature (20 to 30° C.), and then the step is forwarded to the next stage.

The final stage of kneading means a step of mixing a vulcanizing agent and kneading. The highest temperature of the tire rubber composition in the final stage is preferably from 60 to 140° C., more preferably from 80 to 120° C., even more preferably from 100 to 120° C. The kneading time is preferably from 10 seconds to 20 minutes, more preferably from 10 seconds to 10 minutes, even more preferably from 20 seconds to 5 minutes.

In going on from the first stage to the intermediate stage and to the final stage, it is desirable that the temperature is lowered by 10° C. or more from the temperature after the end of the kneading in the previous stage, preferably lowered to room temperature (20 to 30° C.), and then the step is forwarded to the next stage.

For example, in the first stage of kneading, as a first master batch kneading stage, the rubber component (A), all or part of the inorganic filler (B) and all or part of the silane coupling agent (C) are kneaded, spontaneously cooled and aged, and then as an intermediate stage, the thiosemicarbazone derivative (D) may be added and further kneaded.

The ratio by mass of the silane coupling agent (C) to the inorganic filler (B) in the tire rubber composition in the first stage of kneading in the present invention {silane coupling agent (C)/inorganic filler (B)} is preferably from (1/100) to (60/100). This is because, when the ratio is (1/100) or more, the effect of improving the low-heat-generation property of the tire rubber composition is exhibited, and when (60/100) or less, the cost of the tire rubber composition is not too high and therefore the economic efficiency is improved. Further, the ratio by mass {silane coupling agent (C)/inorganic filler (B)} is more preferably from (3/100) to (50/100), even more preferably from (3/100) to (20/100).

In the production method for the tire rubber composition of the present invention, various additives that are generally incorporated in a rubber composition, for example, a vulcanization activator such as stearic acid, resin acid, zinc oxide or the like, an antioxidant and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, a kneader, a twin-screw extruder, etc.

Examples

The present invention is described in more detail with reference to the following prophetic Examples; however, the present invention is not limited at all to the following prophetic Examples.

The rubber composition whose compounding formulation is shown in the following Table is kneaded in a Banbury mixer, and the low-heat-generation property (tan δ index) and the abrasion resistance (index) of the rubber composition, after being vulcanized, is determined according to the methods described below. The data below are prophetic data.

1) Low Heat-Generation Property (Tan δ Index)

Using a spectrometer manufactured by Ueshima Seisakusho Co., Ltd. (dynamic viscoelasticity measuring device), a dynamic viscoelasticity test is performed at a frequency of 52 Hz, at an initial strain of 10%, at a temperature of 60° C. and at a dynamic strain of 1% to measure the value of tan δ thereof. The numerical value in Comparative Example 1, 2, 3 or 4 is referred to 100, and the data are expressed as index indication according to the following formula. The samples having a smaller index value tan δ have a better low-heat-generation property.

Low-Heat-Generation Index={(tan δ of vulcanized rubber composition tested)/(tan δ of vulcanized rubber composition of Comparative Example 1, 2, 3 or 4)}×100

2) Abrasion Resistance (Index)

According to JIS K 6264-2:2005 and using a Lambourn abrasion tester, a test is performed at room temperature (23° C.) and at a slip ratio of 25%. The numerical value of the reciprocal of the amount of wear in Comparative Example 1, 2, 3 or 4 is referred to as 100, and the data are expressed as index indication according to the following formula. The samples having a larger numerical value are better.

Abrasion Resistance Index={(amount of wear of vulcanized rubber composition of Comparative Example 1, 2, 3 or 4)/(amount of wear of vulcanized rubber composition tested)}×100

Examples 1 to 12 and Comparative Examples 1 to 4

According to the compounding formulation and the kneading method shown in Tables 1 to 4, the components are kneaded with a Banbury mixer in such a manner that the highest temperature of the rubber composition in the first stage of kneading is 160° C. in every case, thereby preparing 16 types of rubber compositions. In Examples 1, 2, 4, 5, 7, 8, 10 and 11, the rubber component (A), all the inorganic filler (B), all carbon black and all the silane coupling agent (C) are kneaded in the first stage of kneading the rubber composition, and after 30 seconds, acetonethiosemicarbazone (D) is added and further kneaded. In Examples 3, 6, 9 and 12, acetonesemithiocarbazone is added and kneaded in the final stage of kneading the rubber composition.

On the other hand, in Comparative Examples 1 to 4, the components are kneaded without adding acetonesemithiocarbazone. The rubber composition is vulcanized at a temperature of 165° C., and the vulcanization time is defined as $t_c(90)$ value (min)×1.5 times {$t_c(90)$ defined in JIS K 6300-2:2001}. The low-heat-generation property (tan δ index) and the abrasion resistance (index) of the resultant 16 types of rubber compositions are evaluated according to the above-mentioned methods. The results are shown in Tables 1 to 4.

TABLE 1

| Compounding Formulation (part by mass) | | | Example 1 | Example 2 | Example 3 | Comparative Example 1 |
|---|---|---|---|---|---|---|
| Compounding Formulation | First Stage of Kneading | Solution-polymerized SBR *1 | 100.00 | 100.00 | 100.00 | 100.00 |
| | | N220 carbon *2 | 60.00 | 60.00 | 60.00 | 60.00 |
| | | Silica *3 | 20.00 | 20.00 | 20.00 | 20.00 |
| | | Silane compound-A *4 | 2.00 | 2.00 | 2.00 | 2.00 |
| | | Acetonethiosemicarbazone *5 | 0.50 | 1.00 | — | — |
| | | Aromatic oil | 10.00 | 10.00 | 10.00 | 10.00 |

TABLE 1-continued

| Compounding Formulation (part by mass) | | Example 1 | Example 2 | Example 3 | Comparative Example 1 |
|---|---|---|---|---|---|
| Final Stage of Kneading | Acetonethiosemicarbazone | — | — | 1.00 | — |
| | Stearic acid | 2.00 | 2.00 | 2.00 | 2.00 |
| | Antioxidant-6PPD *6 | 1.00 | 1.00 | 1.00 | 1.00 |
| | Antioxidant-TMQ *7 | 1.00 | 1.00 | 1.00 | 1.00 |
| | Zinc oxide | 2.50 | 2.50 | 2.50 | 2.50 |
| | Vulcanization accelerator-DPG *8 | 0.20 | 0.20 | 0.20 | 0.20 |
| | Vulcanization accelerator-MBTS *9 | 1.00 | 1.00 | 1.00 | 1.00 |
| | Vulcanization accelerator-TBBS *10 | 0.60 | 0.60 | 0.60 | 0.60 |
| | Sulfur | 1.50 | 1.50 | 1.50 | 1.50 |
| Vulcanization Properties | Low-heat-generation property (tanδ index) | 83 | 75 | 85 | 100 |
| | Abrasion Resistance (index) | 112 | 119 | 120 | 100 |

TABLE 2

| Compounding Formulation (part by mass) | | | Example 4 | Example 5 | Example 6 | Comparative Example 2 |
|---|---|---|---|---|---|---|
| Compounding Formulation | First Stage of Kneading | Solution-polymerized SBR *1 | 100.00 | 100.00 | 100.00 | 100.00 |
| | | N220 carbon *2 | 10.00 | 10.00 | 10.00 | 10.00 |
| | | Silica *3 | 80.00 | 80.00 | 80.00 | 80.00 |
| | | Silane compound-A *4 | 8.00 | 8.00 | 8.00 | 8.00 |
| | | Acetonethiosemicarbazone *5 | 0.50 | 1.00 | — | — |
| | | Aromatic oil | 30.00 | 30.00 | 30.00 | 30.00 |
| | Final Stage of Kneading | Acetonethiosemicarbazone | — | — | 1.00 | — |
| | | Stearic acid | 2.00 | 2.00 | 2.00 | 2.00 |
| | | Antioxidant-6PPD *6 | 1.00 | 1.00 | 1.00 | 1.00 |
| | | Antioxidant-TMQ *7 | 1.00 | 1.00 | 1.00 | 1.00 |
| | | Zinc oxide | 2.50 | 2.50 | 2.50 | 2.50 |
| | | Vulcanization accelerator-DPG *8 | 0.60 | 0.60 | 0.60 | 0.60 |
| | | Vulcanization accelerator-MBTS *9 | 1.00 | 1.00 | 1.00 | 1.00 |
| | | Vulcanization accelerator-TBBS *10 | 0.60 | 0.60 | 0.60 | 0.60 |
| | | Sulfur | 1.50 | 1.50 | 1.50 | 1.50 |
| Vulcanization Properties | | Low-heat-generation property (tanδ index) | 75 | 64 | 76 | 100 |
| | | Abrasion Resistance (index) | 113 | 120 | 119 | 100 |

TABLE 3

| Compounding Formulation (part by mass) | | | Example 7 | Example 8 | Example 9 | Comparative Example 3 |
|---|---|---|---|---|---|---|
| Compounding Formulation | First Stage of Kneading | Solution-polymerized SBR *1 | 100.00 | 100.00 | 100.00 | 100.00 |
| | | N220 carbon *2 | 60.00 | 60.00 | 60.00 | 60.00 |
| | | Silica *3 | 20.00 | 20.00 | 20.00 | 20.00 |
| | | Silane compound-B *11 | 2.00 | 2.00 | 2.00 | 2.00 |
| | | Acetonethiosemicarbazone *5 | 0.50 | 1.00 | — | — |
| | | Aromatic oil | 10.00 | 10.00 | 10.00 | 10.00 |
| | Final Stage of Kneading | Acetonethiosemicarbazone | — | — | 1.00 | — |
| | | Stearic acid | 2.00 | 2.00 | 2.00 | 2.00 |
| | | Antioxidant-6PPD *6 | 1.00 | 1.00 | 1.00 | 1.00 |
| | | Antioxidant-TMQ *7 | 1.00 | 1.00 | 1.00 | 1.00 |
| | | Zinc oxide | 2.50 | 2.50 | 2.50 | 2.50 |
| | | Vulcanization accelerator-DPG *8 | 0.20 | 0.20 | 0.20 | 0.20 |
| | | Vulcanization accelerator-MBTS *9 | 1.00 | 1.00 | 1.00 | 1.00 |
| | | Vulcanization accelerator-TBBS *10 | 0.60 | 0.60 | 0.60 | 0.60 |
| | | Sulfur | 1.50 | 1.50 | 1.50 | 1.50 |
| Vulcanaization Properties | | Low-heat-generation property (tanδ index) | 88 | 81 | 88 | 100 |
| | | Abrasion Resistance (index) | 121 | 127 | 126 | 100 |

TABLE 4

| Compounding Formulation (part by mass) | | | Example 10 | Example 11 | Example 12 | Comparative Example 4 |
|---|---|---|---|---|---|---|
| Compounding Formulation | First Stage of Kneading | Solution-polymerized SBR *1 | 100.00 | 100.00 | 100.00 | 100.00 |
| | | N220 carbon *2 | 10.00 | 10.00 | 10.00 | 10.00 |
| | | Silica *3 | 80.00 | 80.00 | 80.00 | 80.00 |
| | | Silane compound-B *11 | 8.00 | 8.00 | 8.00 | 8.00 |
| | | Acetonethiosemicarbazone *5 | 0.50 | 1.00 | — | — |
| | | Aromatic oil | 30.00 | 30.00 | 30.00 | 30.00 |

TABLE 4-continued

| Compounding Formulation (part by mass) | | Example 10 | Example 11 | Example 12 | Comparative Example 4 |
|---|---|---|---|---|---|
| Final Stage of Kneading | Acetonethiosemicarbazone | — | — | 1.00 | — |
| | Stearic acid | 2.00 | 2.00 | 2.00 | 2.00 |
| | Antioxidant-6PPD *6 | 1.00 | 1.00 | 1.00 | 1.00 |
| | Antioxidant-TMQ *7 | 1.00 | 1.00 | 1.00 | 1.00 |
| | Zinc oxide | 2.50 | 2.50 | 2.50 | 2.50 |
| | Vulcanization accelerator-DPG *8 | 0.60 | 0.60 | 0.60 | 0.60 |
| | Vulcanization accelerator-MBTS *9 | 1.00 | 1.00 | 1.00 | 1.00 |
| | Vulcanization accelerator-TBBS *10 | 0.60 | 0.60 | 0.60 | 0.60 |
| | Sulfur | 1.50 | 1.50 | 1.50 | 1.50 |
| Vulcanaization Properties | Low-heat-generation property (tanδ index) | 82 | 73 | 81 | 100 |
| | Abrasion Resistance (index) | 119 | 127 | 127 | 100 |

[Notes]

*1 to *11 in Table 1 to Table 4 are as follows.

*1 Solution-polymerized SBR manufactured by Asahi Kasei Corp., trade name "Toughden 2000R"

*2 Trade name "#80" manufactured by Asahi Carbon Co., Ltd.

*3 Trade name "Nipsil AQ" (BET surface area=205 m²/g), manufactured by Tosoh Silica Corporation

*4 Silane compound-A: bis(3-triethoxysilylpropyl)disulfide (mean sulfur chain length: 2.35), silane coupling agent manufactured by Evonik, trade name "Si75" (registered trademark)

*5 Acetonethiosemicarbazone, manufactured by Tokyo Chemical Industry Co., Ltd.

*6 N-phenyl-N'(1,3-dimethylbutyl)-p-phenylenediamine, manufactured by Ouchi Shinko Chemical Industrial Co., Ltd., trade name "Nocrac 6C"

*7 2,2,4-Trimethyl-1,2-dihydroquinoline polymer, manufactured by Ouchi Shinko Chemical Industrial Co., Ltd., trade name "Nocrac 224"

*8 1,3-Diphenylguanidine, manufactured by Sanshin Chemical Industry Co., Ltd. trade name "Sanceler D"

*9 Di-2-benzothiazolyl disulfide, manufactured by Sanshin Chemical Industry Co., Ltd. trade name "Sanceler DM"

*10 N-tert-butyl-2-benzothiazolylsulfenamide, manufactured by Sanshin Chemical Industry Co., Ltd. trade name "Sanceler NS"

*11 Silane compound-B: 3-octanoylthiopropyltriethoxysilane, silane coupling agent manufactured by Monentive Performance Materials Inc., trade name "NXT Silane" (registered trademark)

As obvious from Tables 1 to 4, the tire rubber compositions of Examples 1 to 12, as compared with the comparative tire rubber compositions of Comparative Examples 1 to 4, all have good low-heat-generation property (tan δ index) and abrasion resistance (index). In addition, the tire rubber compositions of Examples 2, 5, 8 and 11, as compared with the comparative tire rubber compositions of Examples 3, 6, 9 and 12, all have further better low-heat-generation property (tan δ index).

INDUSTRIAL APPLICABILITY

The tire rubber composition and the preferred production method for the tire rubber composition of the present invention provide rubber composition excellent in low-heat-generation property and abrasion resistance, and are therefore favorably used as a tire rubber composition for use for constitutive members of various tires for passenger cars, small-size trucks, minivans, minitrucks and big-size vehicles (trucks, buses, and further off-the-road vehicles such as construction vehicles, mining carts, etc.) and others, especially for tread members (in particular, top surfaces of tread members) of pneumatic radial tires, and as a producing method for the composition.

The invention claimed is:

1. A tire rubber composition prepared by mixing at least one rubber component comprising styrene-butadiene copolymer rubber (A), a filler comprising an inorganic filler (B), a silane coupling agent (C) and a thiosemicarbazone derivative (D), wherein the thiosemicarbazone derivative (D) is acetonethiosemicarbazone.

2. The tire rubber composition according to claim 1, wherein the silane coupling agent (C) is at least one compound selected from the group consisting of compounds represented by the following general formulae (II) to (IV):

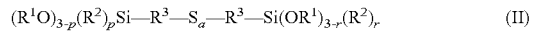

$(R^1O)_{3-p}(R^2)_p Si—R^3—S_a—R^3—Si(OR^1)_{3-r}(R^2)_r$ (II)

wherein plural $R^1$'s, if any, may be the same or different and each represent a substituent selected from a linear, cyclic or branched alkyl group having from 1 to 8 carbon atoms, a linear or branched alkoxylalkyl group having from 2 to 8 carbon atoms, and a hydrogen atom; plural $R^2$'s, if any, may be the same or different and each represent a linear, cyclic or branched alkyl group having from 1 to 8 carbon atoms; plural leis, if any, may be the same or different and each represent a linear or branched alkylene group having from 1 to 8 carbon atoms; a indicates from 2 to 6 as a mean value; and p and r may be the same or different and each indicate from 0 to 3 as a mean value, provided that both p and r are not 3 at the same time;

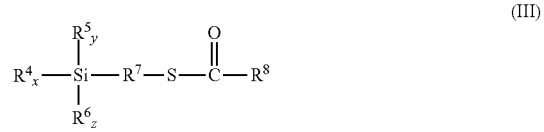

(III)

wherein $R^4$ represents a monovalent group selected from —Cl, —Br, $R^9O—$, $R^9C(=O)O—$, $R^9R^{10}C=NO—$, $R^9R^{10}CNO—$, $R^9R^{10}N—$, and $—(OSiR^9R^{10})_h(OSiR^9R^{10}R^{11})$ (where $R^9$, $R^{10}$ and $R^{11}$ each represent a hydrogen atom or a monovalent hydrocarbon group having from 1 to 18 carbon atoms; and h indicates from 1 to 4 as a mean value); $R^5$ represents $R^4$, a hydrogen atom, or a monovalent hydrocarbon group having from 1 to 18 carbon atoms; $R^6$ represents $R^4$, $R^5$, a hydrogen atom, or a group —[O(R$^{12}$O)$_j$]$_{0.5}$ (where R$^{12}$ represents an alkylene group having from 1 to 18 carbon atoms; and j indicates an integer of from 1 to 4); R$^7$ represents a divalent hydrocarbon group having from 1 to 18 carbon atoms; R$^8$ represents a monovalent hydrocarbon group having from 1 to 18 carbon atoms; x, y and z each indicate a number satisfying the relationship of x+y+2z=3, 0≤x≤3, 0≤y≤2, 0≤z≤1;

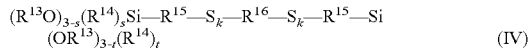  (IV)

wherein plural R$^{13}$'s, if any, may be the same or different and each represent a linear, cyclic or branched alkyl group having from 1 to 8 carbon atoms, a linear or branched alkoxylalkyl group having from 2 to 8 carbon atoms, or a hydrogen atom; plural R$^{14}$'s, if any, may be the same or different and each represent a linear, cyclic or branched alkyl group having from 1 to 8 carbon atoms; plural R$^{15}$'s, if any, may be the same or different and each represent a linear or branched alkylene group having from 1 to 8 carbon atoms; V represents a divalent group selected from general formulae (—S—R$^{17}$—S—), (—R$^{18}$—S$_{m1}$—R$^{19}$—) and (—R$^{20}$—S$_{m2}$—R$^{21}$—S$_{m3}$—R$^{22}$—) (where R$^{17}$ to R$^{22}$ each represent a divalent substituent selected from a divalent hydrocarbon group, a divalent aromatic group and a divalent organic group containing a hetero element except sulfur and oxygen, each having from 1 to 20 carbon atoms; m1, m2 and m3 each indicate from 1 to less than 4 as a mean value); plural k's may be the same or different and each indicate from 1 to 6 as a mean value; and s and t each indicate from 0 to 3 as a mean value, provided that both s and t are not 3 at the same time.

3. The tire rubber composition according to claim 2, wherein the silane coupling agent (C) is a compound represented by the general formula (II).

4. The tire rubber composition according to claim 1, wherein the inorganic filler (B) is silica.

5. The tire rubber composition according to claim 1, wherein the filler contains carbon black.

6. The tire rubber composition according to claim 1, wherein the inorganic filler (B) accounts for 40% by mass or more in the filler.

7. A tire using the tire rubber composition of claim 1.

8. The tire rubber composition according to claim 4, wherein the tire rubber composition is kneaded in plural stages, and all of the rubber component (A), all or part of the silica, all or part of the silane coupling agent (C), and all of the thiosemicarbazone derivative (D) are kneaded in a first stage of kneading, or in the first stage of kneading, as a first master batch kneading stage, all of the rubber component (A), all or part of the silica, and all or part of the silane coupling agent (C) are kneaded, spontaneously cooled and aged, and then as an intermediate stage, all of the thiosemicarbazone derivative (D) is added and further kneaded.

9. The tire rubber composition according to claim 3, wherein
the inorganic filler (B) is silica,
the filler comprises carbon black,
the filler is incorporate in an amount of from 20 to 150 parts by mass relative to 100 parts by mass of the rubber component (A),
the inorganic filler (B) is incorporated in an amount of from 20 to 120 parts by mass relative to 100 parts by mass of the rubber component (A),
the thiosemicarbazone derivative (D) is incorporated in an amount of from 0.05 to 15 parts by mass relative to 100 parts by mass of the rubber component (A),
a ratio by mass of the thiosemicarbazone derivative (D) to the silane coupling agent (C) in the tire rubber composition is from 0.02 to 1.0, and
a ratio by mass of the silane coupling agent (C) to the inorganic filler (B) in the tire rubber composition is from 0.01 to 0.6.

10. The tire rubber composition according to claim 9, wherein
the inorganic filler (B) is incorporated in an amount of from 30 to 100 parts by mass relative to 100 parts by mass of the rubber component (A),
the thiosemicarbazone derivative (D) is incorporated in an amount of from 0.2 to 10 parts by mass relative to 100 parts by mass of the rubber component (A),
the ratio by mass of the thiosemicarbazone derivative (D) to the silane coupling agent (C) in the tire rubber composition is from 0.04 to 0.5, and
the ratio by mass of the silane coupling agent (C) to the inorganic filler (B) in the tire rubber composition is from 0.03 to 0.2.

* * * * *